United States Patent [19]

King

[11] Patent Number: 4,937,819
[45] Date of Patent: Jun. 26, 1990

[54] TIME ORTHOGONAL MULTIPLE VIRTUAL DCE FOR USE IN ANALOG AND DIGITAL NETWORKS

[75] Inventor: Joseph B. King, St. Petersburg, Fla.

[73] Assignee: A.T. & T. Paradyne, Largo, Fla.

[21] Appl. No.: 249,450

[22] Filed: Sep. 26, 1988

[51] Int. Cl.$^5$ .............................................. H04J 3/16
[52] U.S. Cl. ................... 370/95.3; 370/95.1; 370/85.7; 370/104.1
[58] Field of Search ................ 370/96, 90, 85, 86, 370/95, 79, 82, 94, 104, 95.1, 95.2, 95.3, 85.7, 104.1, 94.1; 375/12, 13, 14; 340/825.5, 825.51

[56] References Cited

U.S. PATENT DOCUMENTS

| | | | |
|---|---|---|---|
| 4,398,289 | 8/1983 | Schoute | 370/95 |
| 4,489,416 | 12/1984 | Stuart | 375/13 |
| 4,606,023 | 8/1986 | Dragoo | 370/104 |
| 4,644,534 | 2/1987 | Sperlich | 370/95 |
| 4,653,049 | 3/1987 | Shinmyo | 370/95 |
| 4,669,090 | 5/1987 | Betts et al. | 375/13 |
| 4,694,453 | 9/1987 | Kobayashi et al. | 370/85 |
| 4,726,017 | 2/1988 | Krum et al. | 370/85 |
| 4,742,512 | 5/1988 | Akashi et al. | 370/96 |
| 4,748,621 | 5/1988 | Ballance et al. | 370/95 |
| 4,757,502 | 7/1988 | Meuriche et al. | 370/104 |
| 4,759,016 | 7/1988 | Otsuka | 370/95 |
| 4,797,878 | 1/1989 | Armstrong | 370/96 |
| 4,800,560 | 1/1989 | Aoki et al. | 370/104 |
| 4,807,259 | 2/1989 | Yamanaka et al. | 370/85 |

OTHER PUBLICATIONS

Mischa Schwartz, "Communication Systems & Techniques", 1966, p. 173.
A. Bruce Carlson, "Communication Systems: An introduction to Signals & Noise in Electrical Communication", 1968, p. 377.
James Martin, "Satellite Communications", 1978, pp. 276-278.

Primary Examiner—Douglas W. Olms
Assistant Examiner—Alpus H. Hsu
Attorney, Agent, or Firm—Kane, Dalsimer, Sullivan, Kurucz, Levy, Eisele and Richard

[57] ABSTRACT

Apparatus and method for time division multiple access in a multidrop system with multiple host applications Employing half-duplex polled protocols is disclosed. Ranging with respect to time is used so as to reduce guard time between successive transmissions thereby increasing system efficiency. Host applications can request extra time slots for long messages via a request bit within the message format.

15 Claims, 9 Drawing Sheets

TIME ORTHOGONAL MULTIPLE VIRTUAL DCE FOR USE IN ANALOG AND DIGITAL NETWORKS

BACKGROUND OF INVENTION

1. Field of Invention

This invention relates to an apparatus and method for a master unit in a multidrop network to communicate to and from a plurality of remote units, using a plurality of host applications using half duplex polled protocols, through the use of time division multiple access techniques.

2. Scope of the Prior Art

In the prior art, in order to run multiple host applications to multiple modems in a multidrop network, it is common to use a single network channel for each application, thereby effectively resulting in a number of networks rather than a single network. Further, such an arrangement is clearly an inefficient use of leased lines and other equipment.

A common solution to this deficiency of the prior art is to use a single line with frequency division multiplexing. That is, a number of orthogonal carrier frequencies, one for each application, are transmitted over a single line to a plurality of remote units in a multidrop network. However, with such apparatus, the non-linearities of the communications line (most frequently, a telephone line), interfere with the co-existence of multiple carrier frequencies. This interference includes intermodulation, cross-modulation and spillover between and among channels. Furthermore, a strong signal on one carrier frequency could suppress a weak signal on another carrier frequency.

Due to this interference, time-consuming engineering adjustment is required to install and maintain such a system. Such interference increases with an increasing number of co-existing carrier frequencies, thereby limiting the number of carrier frequencies which could be practically carried on a single line. For practical applications, no more than three carrier frequencies can be carried simultaneously on a telephone line.

OBJECTS AND SUMMARY OF THE INVENTION

It is therefore an object of this invention to provide a method and apparatus for allowing a single multidrop network to run multiple applications to multiple remote units.

It is therefore a further object of this invention to provide such a method and apparatus without a fundamental limitation on the number of applications which can be implemented.

It is therefore a further object of this invention to reduce the amount of engineering adjustment needed to install and maintain such a method and apparatus.

The present method and apparatus permits multiple multidrop networks (such as Dataphone Digital Service for digital applications or conventional telephone company lines for analog applications), each serving a distinct half-duplex host polled application, to be replaced by a single multidrop network serving each of said host applications.

The basic features of this method and apparatus are time division multiplexed outbound transmissions from the master to the remote units for data and control; time division multiple access transmissions inbound from the remote units to the master unit; master to remote ranging with respect to transmission time; and priority assigned reservation request for long poll responses. A channel rate exceeding the aggregate port rate is required in order to transmit effectively all of the information from the remote units and allow for control format messages. All remote units (or "drops") receive messages outbound from the control unit and respond in a unique time period assigned to each host application. Contention between applications is thereby avoided due to the fact that each application is assigned such a unique time period. By ranging or measuring the round-trip transmission or delay time between the master unit and each remote unit, and storing these times in a table so as to accurately synchronize the transmissions in a time division multiple access mode, the "guard time" separating inbound transmissions from interfering with each other can be minimized thereby increasing system efficiency.

In order to accommodate longer message lengths from a remote unit to the master unit, a remote unit can append a request for additional time onto its message to the master unit. The master unit will then compare the priority of the requesting remote unit to the priority of subsequent units and make a decision as to whether to allow the requesting remote unit to use the time division multiple access slots of subsequent units.

By the use of the foregoing, a user can install several host applications employing half duplex polling on a single multidrop network, without a fundamental limit on the number of applications and without the need for extensive engineering adjustment during the installation and maintenance of the system. This allows an end user to have fewer modems or data service units/channel service units (DSU/CSU) on the customer premises.

BRIEF DESCRIPTION OF THE DRAWINGS

FIG. I shows a block diagram of the master unit in the digital application of this invention.

FIG. II shows a block diagram of the remote unit in the digital application of this invention.

FIG. III shows a block diagram of the master unit in the analog application of this invention.

FIG. IV shows a block diagram of the remote unit in the analog application of this invention.

FIG. V shows a schematic of a subframe format.

FIG. VI shows a flow diagram of the initialization of the master unit.

FIG. VII shows a flow diagram of the initialization of the remote unit.

FIG. VIII shows a flow diagram of the normal operation of the master unit.

FIG. IX shows a flow diagram of the normal operation of the remote unit.

DETAILED DESCRIPTION OF THE PREFERRED EMBODIMENT

Figure 1:
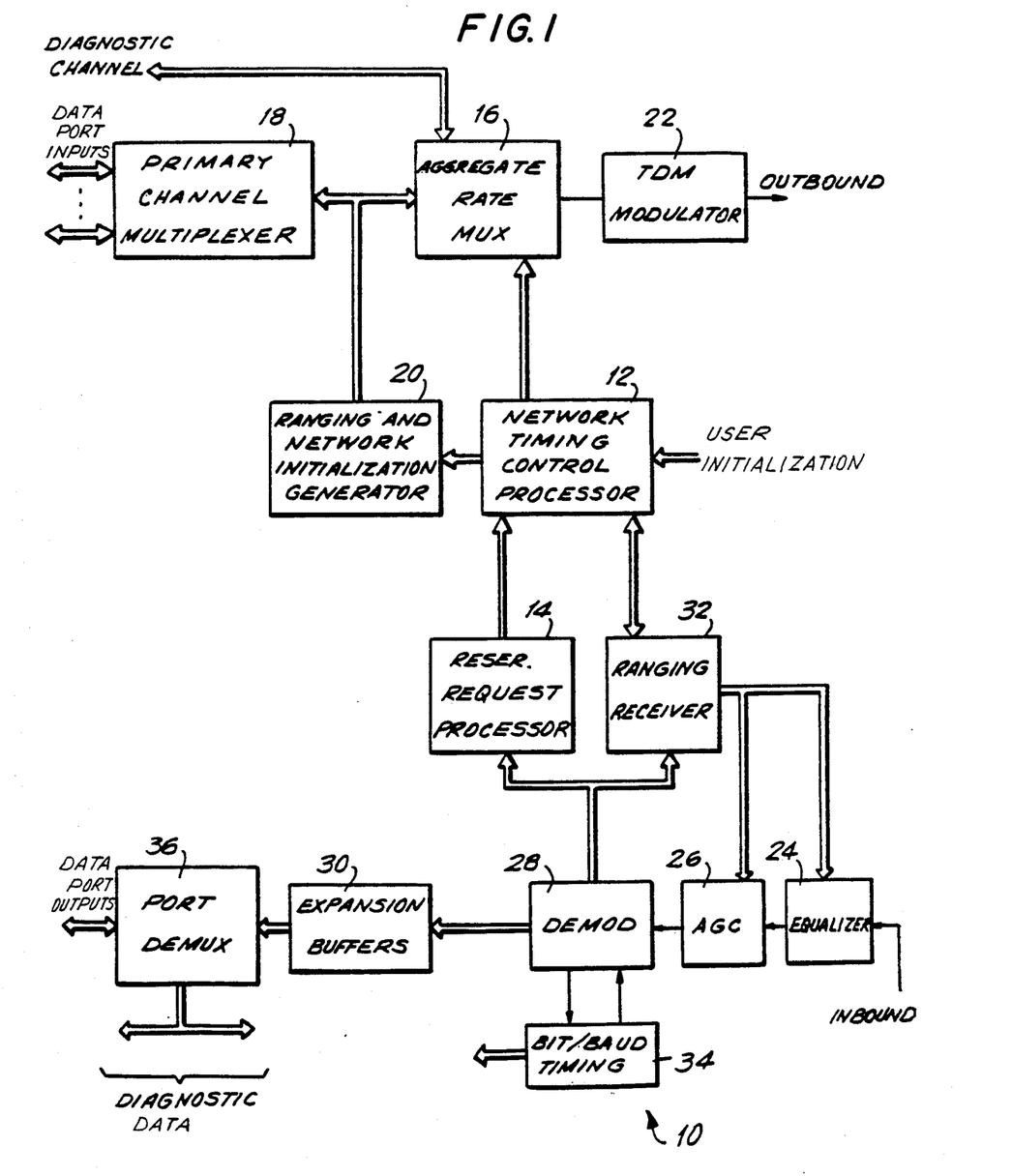
Figure 2:
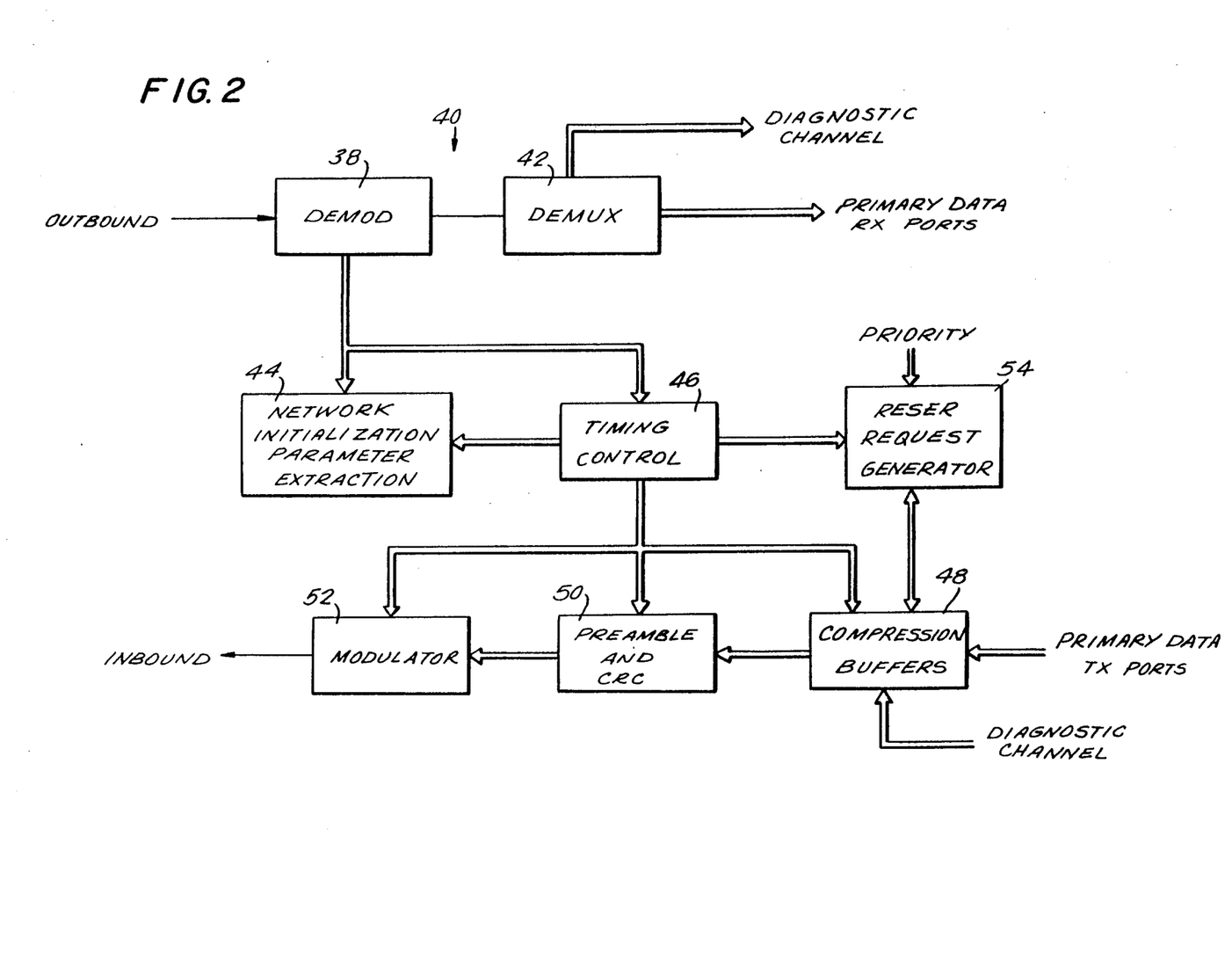
Figure 3:
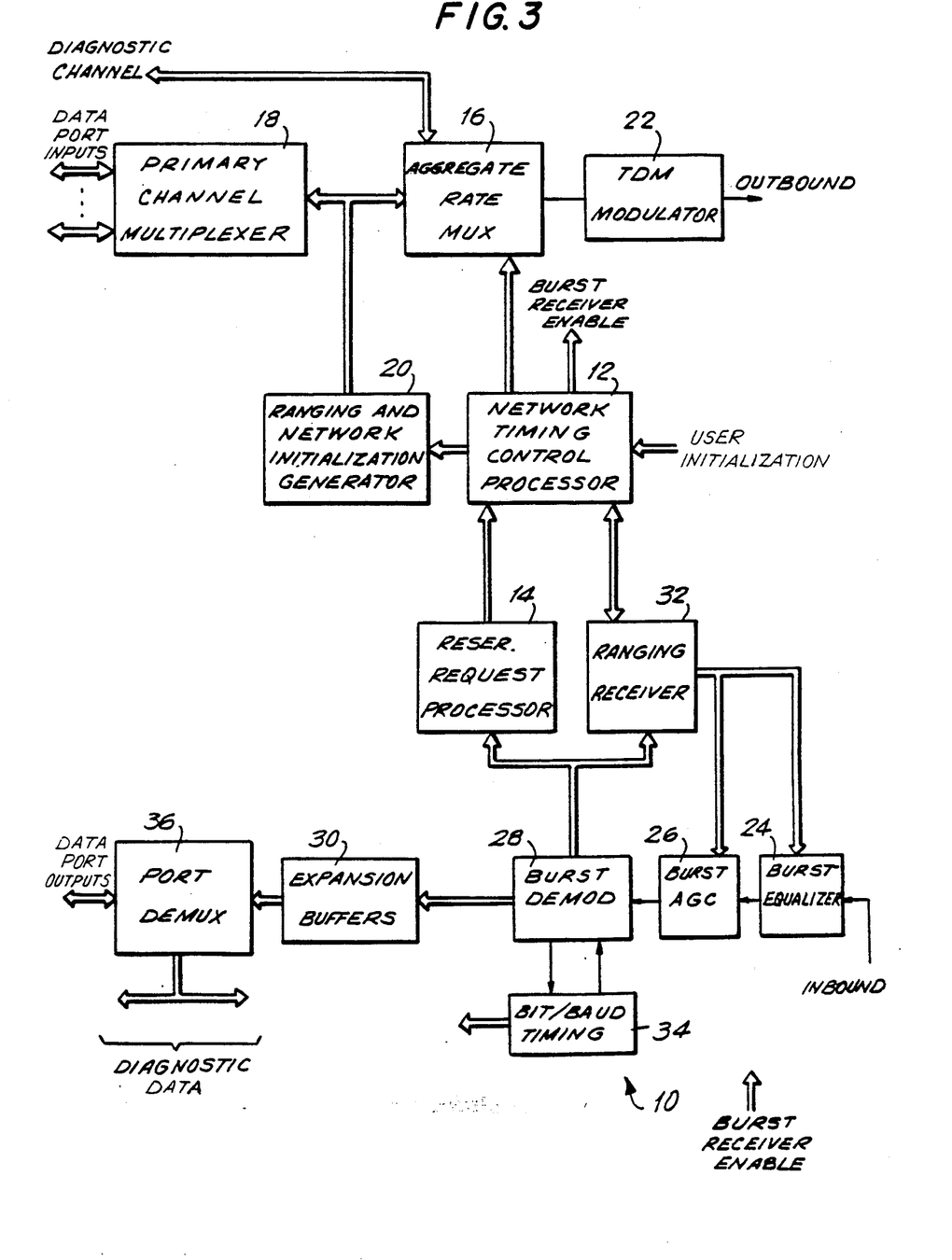
Figure 4:
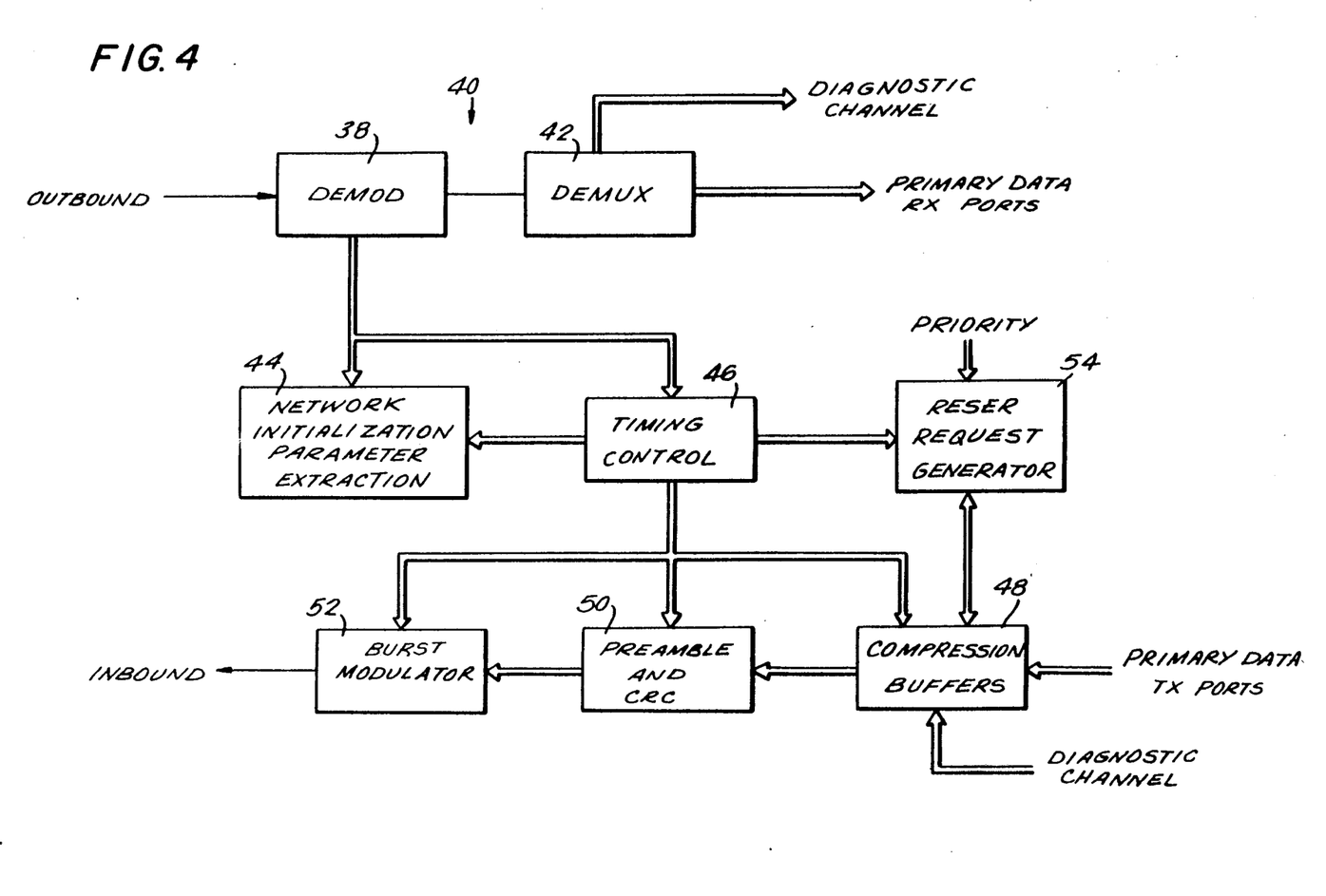
Figure 5:
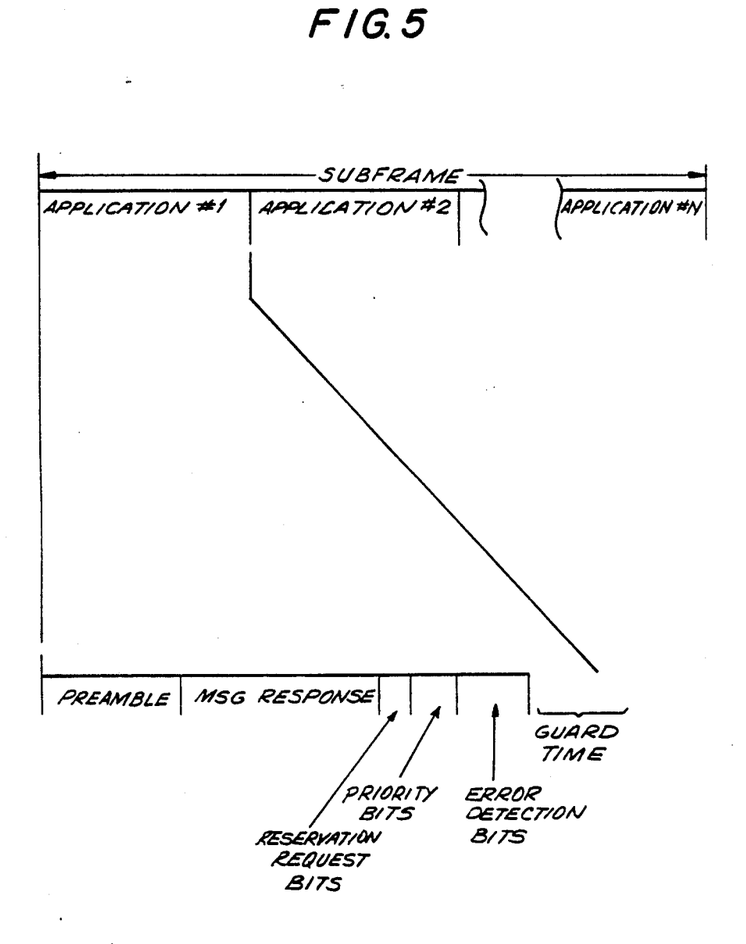
Figure 6:
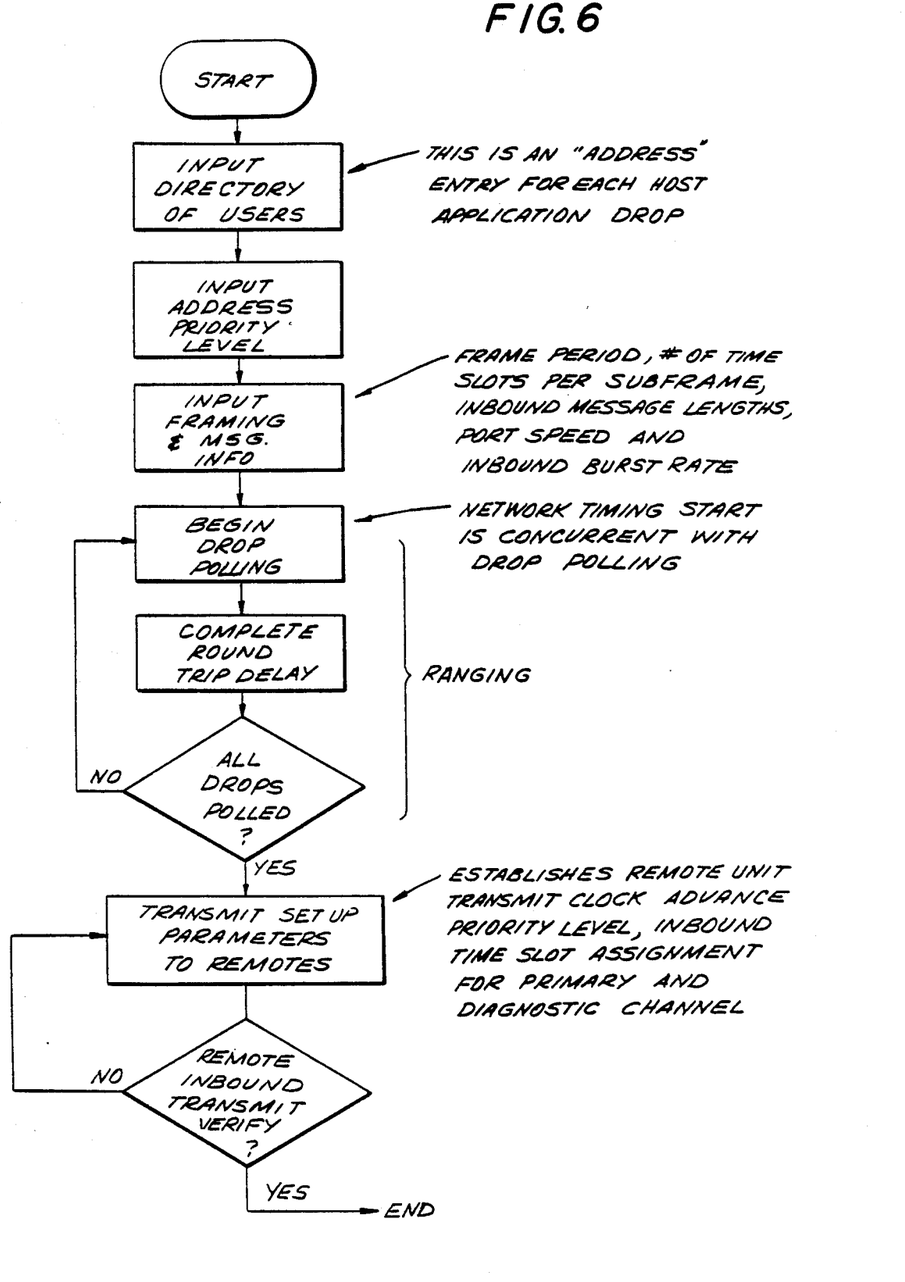
Figure 7:
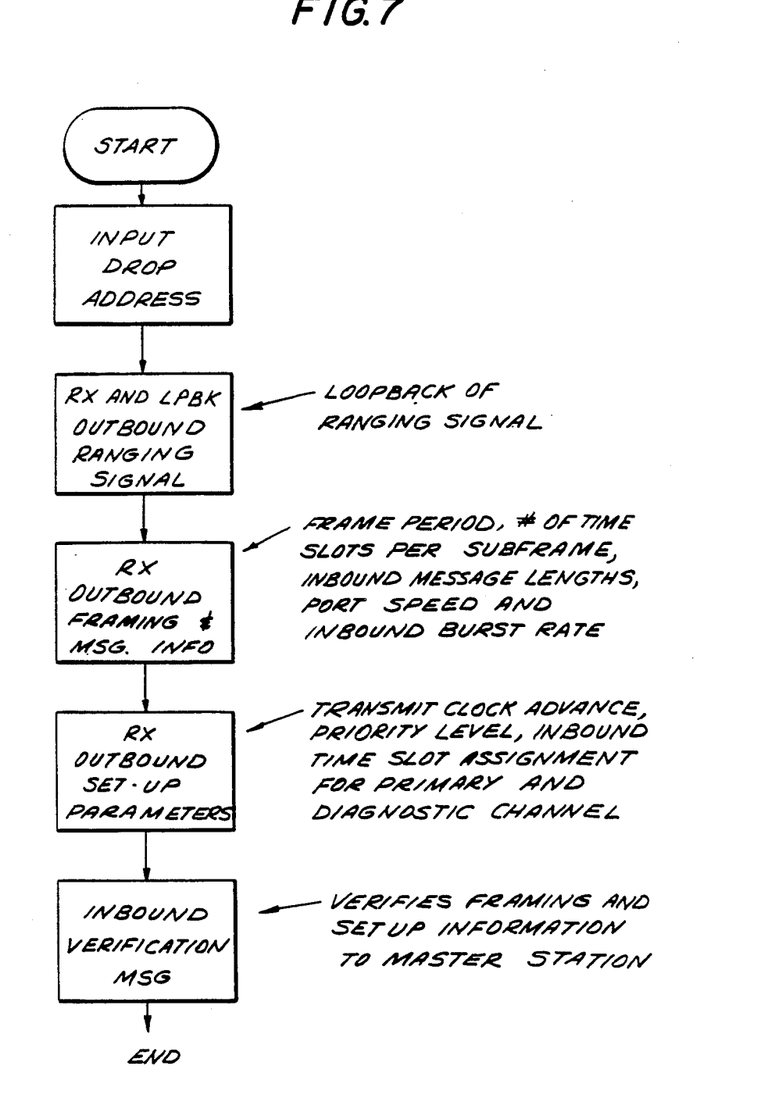
Figure 8:
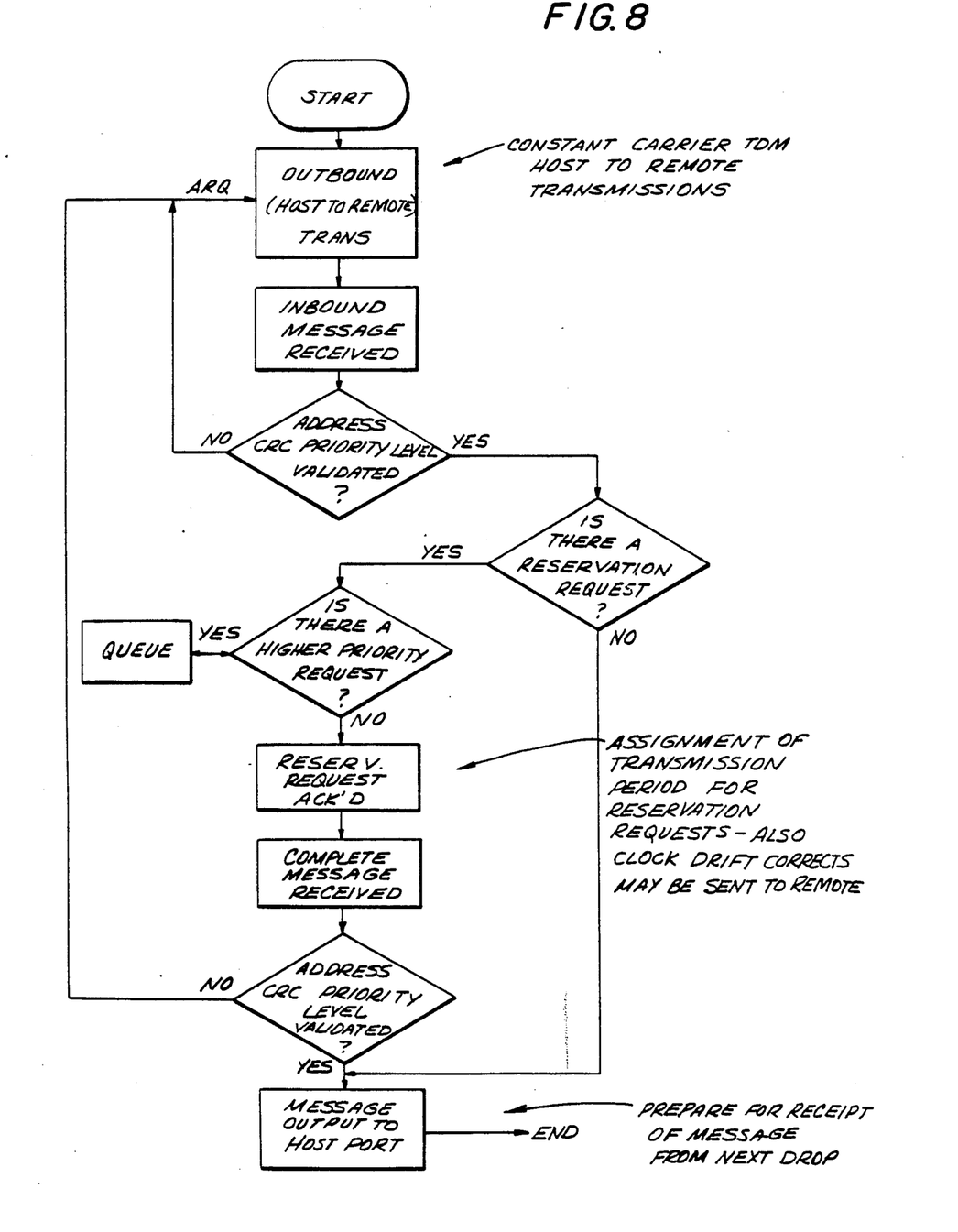
Figure 9:
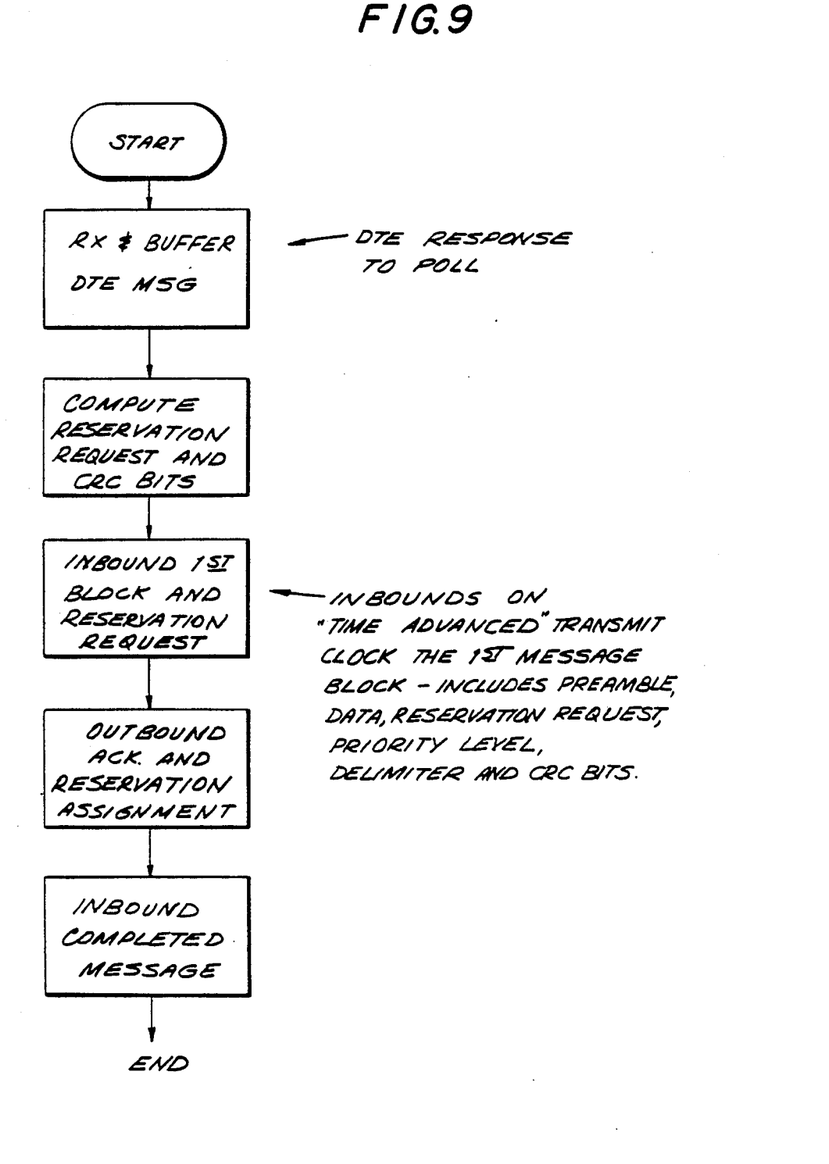

Referring now to the drawings in detail wherein like numerals refer to like elements throughout the several views, master unit 10 for digital applications is shown FIG. I. Master unit 10 includes a network timing and control processor 12. Network timing and control processor 12 uses firmware or software to implement clock drift reset functions, guard time predict functions, burst receiver control functions, reservation assignment functions, cyclic redundancy check (crc) "checksum" calculations, arq functions, remote transmit control functions and user library update functions such as activity rate and frame parameters. Additionally, network timing and control processor 12 stores user-input initialization parameters including network clock framing periods, slot and subframe assignments, inbound and outbound burst length for each "drop" or remote unit, priority assignments, drop addressing, and port speed assignments.

Reservation request processor 14 allows a drop or remote unit to request more than a single time slot for longer messages. Reservation request processor 14 communicates such a granted request to the network timing and control processor 12.

The aggregate rate multiplexing module 16, in response to commands from the network timing and control processor 12, sets up the timing and bit interleaving of the various application inputs from the various input ports of the primary channel multiplexer 18 and of the overhead and control bits required for outbound control of the remote units from the ranging and network initialization generator 20. The output of the aggregate rate multiplexer 16 is input to the time division multiplexed modulator 22 which transmits the data to the various drops or remote units (see FIG. II). The time division multiplexed modulator 22 is typically a baseband modulator for digital applications.

The master unit 10 also provides, in addition to primary traffic flow over the channel outbound to remote units, a diagnostic channel which can be inband, and any control information necessary to update clock drifts, perform new ranging, etc.

The input in the form of noncontending packets or bursts of information from the various drops or remote units is received via a single data channel by equalizer 24. The input stream has its gain automatically adjusted 26 and is demodulated by demodulator 28.

Demodulator 28 provides digital data to the expansion buffers 30, the ranging receiver 32, the reservation request processor 14 and the bit/baud timing processor 34.

The expansion buffers 30 output digital data to the data port outputs of the various applications and a diagnostic channel via the port demultiplexer 36.

The ranging receiver 32 receives data from the demodulator 28 during an initial training period (to be described later) so as to store round trip transmission times to each remote unit. This allows an optimization in synchronization of the time division multiple access process, thereby reducing "guard time" between the reception of data from the various remote units thereby increasing the total data transfer rate of the system.

Referring now to FIG. II, data outbound from the time division multiplexed modulator 22 of FIG. I is received by the demodulator 38 of remote unit 40. The output of demodulator 38 is demultiplexed by demultiplexer 42 which, in turn, feeds the primary data receiver ports and any diagnostic or secondary channel required by the particular application. The demodulator 38 also provides bits to the network initialization parameter extraction module 44 and the timing and control block 46. Network initialization parameter extraction module 44 and timing and control block 46 provide the user with network timing extraction information, the slot assignment in which the user is allowed to operate and any control information such as transmit inhibit, transmit enable, reservation grants and other network control provided by the master unit (see FIG. I). Additionally, the ranging calculations, that is, the master unit calculation of the time a signal takes to go from the master unit to any remote unit and vice versa, is stored in the timing and control block 46 where it is used for time advancing the transmit clock.

The timing and control block 46 supplies control bits to compression buffers 48. The timing and control block 46 also feeds the preamble and cyclic redundancy check ("checksum") module 50 and the modulator 52. Additionally, the timing and control block 46 sets up the reservation request generator 54. Reservation request generator 54 monitors the compression buffer for fields exceeding a preset parameter limit which is stored in the initialization parameter table. If a field length exceeding the parameter is sensed, then reservation request generator 54 automatically sets the reservation bits in the outgoing message. The format of the outgoing message, including reservation bits, crc bits, message traffic and preambles are described later herein.

Modulator 52 outputs messages via the communication lines to equalizer 24 of the master unit (see FIG. I).

FIG. III discloses the analog version of the master unit. FIG. I is identical to FIG. III except for the addition of the automatic gain control/equalizer tap store function which is added to ranging receiver 32 so as to provide operating parameters to the burst equalizer 24 and the burst automatic gain control 26 dependent upon the particular remote unit which is transmitting to the master unit. Furthermore, as data is transmitted in "bursts" from the remote unit in the analog mode, such elements as the demodulator, agc, and equalizer in the master unit are entitled "burst demodulators", "burst agc", and "burst equalizer" respectively in the master unit. Similarly, the analog modulator in the remote unit is entitled "burst modulator" (FIG. IV).

This is due to the fact that, in the preferred embodiment, the analog mode requires a true burst mode of operation whereas in the digital case, the burst mode requirement is eliminated due to the presence of a constant envelope baseband which includes idle codes when data is not being transmitted.

It should be noted here that the digital application, for instance, one using Dataphone Digital Service, has an inherent advantage over the analog counterpart, and is therefore a slightly preferred embodiment, in that the inbound traffic received at the master unit is a continuous transmission. That is, either information or idle codes are always being transmitted. There are no periods when the signal is not present. As a result, the number of overhead bits required in each remote transmission in the digital application is considerably reduced. This combined with the high channel to port speed ratio permits lower delay penalties. This results in a greater efficiency in the digital system as compared with the analog system.

The time division multiple access sequence is established by the user. An epoch period or frame is defined by the user. The frame is divided with respect to time into a number of subframes. The subframe is further subdivided into slots, one for each application. Therefore, an application has a preassigned time period (or slot) within a subframe to transmit from the remote unit to the master unit, with the possibility of a reservation request for longer messages.

FIG. V discloses a typical subframe. A subframe is divided into N time slots, each separated by a guard time. Each slot contains a preamble, message bits, reservation request bits, priority bits, and error detection bits. The reservation and priority bits may be replaced by address bits. For example, five bits would permit up to 32 drops. The address bits would be an identifier to the master. The master could then monitor remote clock accuracy, monitor drop transmission events, perform ranging, etc.

Due to the number of total bits exceeding the number of message bits, the aggregate burst (in the case of analog) or transmission (in the case of digital) rate must be higher than the sum of the independent port rates.

As part of the installation of this device, both the master and remote units must be initialized.

As is disclosed in FIG. VI, the first step in the initialization of the master unit is to input the directory of users. This is an address entry for each host application drop.

The next step is to input the address priority level. This is followed by an initialization of such system parameters as frame period, number of time slots per subframe, inbound message lengths, inbound and outbound transmission rates (notice that aggregate burst rate must be higher than the sum of the independent port rates so as to accommodate individual ports along with associated overhead), priority assignments, drop addressing and, port speed assignments. This information is stored in the network timing and control processor.

The initialization phase of operation also includes a ranging calculation for each combination of remote unit (or "drop") and application. The master unit sends a message which makes a round-trip between the master unit and the individual remote unit. The delay period is stored in a library table in the network timing and control processor 12 so that the remote to master unit communication is synchronized, thereby reducing guard time required between successive transmissions and increasing the efficiency of the system.

Additionally, in the case of analog apparatus, the signals received by the master unit during the ranging calculation are used to train the automatic gain control 26 and the equalizer 24, thereby generating an automatic gain control/equalizer tap store function.

Finally, "set-up" parameters are transmitted from the master unit to the remote units so as to establish remote unit transmit clock advances, priority level, and inbound time slot assignments for the primary and diagnostic channels. The remote unit verifies receipt to the master unit.

Initialization of the remote drops is disclosed in FIG. VII. The user inputs the address of the drop or remote unit. The remote unit returns or "loops-back" the ranging signal from the master unit. The remote unit receives the frame period, the number of time slots per subframe, inbound message lengths, port speed and inbound burst (digital) or transmission (analog) rate.

The remote unit receives set-up parameters such as clock advance, priority level and inbound time slot assignment for the primary and diagnostic framing and set-up information to the master unit.

A flow diagram of the normal operation of the master unit is shown in FIG. VIII.

The master unit sends a message to one of the remote units. An inbound message is received from one of the remote units. The address, cyclic redundancy calculation (i.e. checksum) and priority level are checked. If any of these values are invalid, the master unit retransmits to the remote unit. If these values are valid and there is no reservation request, the message is output to the appropriate application host port at the master end. This process is continually repeated for each application in each remote unit.

If the aforementioned values are valid but there is a reservation request, then the message is queued in the event that there is a higher priority request or acknowledged and completely received in the event that there is no higher priority request. After the complete message is received, its address, checksum and priority are validated. If these values are valid, the message is output to the host port. If the values are not valid, the initial step of an outbound transmission from the master to the remote is returned.

FIG. IX discloses the normal operation of a drop or remote unit. The remote unit receives and buffers a DTE poll response message. The remote unit computes the reservation request and the CRC (cyclic redundancy check or checksum) bits. The CRC bits provide error detection for both overhead and transmit port primary data bits. The remote unit transmits the first block of data, and possibly a reservation request on the inbound channel at a predetermined time in accordance with the "time advanced" (to allow for transmission time and synchronize so as to reduce guard time) transmit clock. This block of data includes preamble data, reservation request, priority level, delimiter and CRC bits.

From the foregoing, it is seen that this system includes the following features:

1. The master to remote (outbound) transmission is a constant carrier time division multiplexed bit stream in which multiple Host/FEP poll and data traffic is bit interleaved along with master to remote network timing control and diagnostic information.

2. The master unit periodically transmits a network clock reading to all remotes and performs a roundtrip delay transmission calculation ("ranging") to each remote unit. The master unit informs each remote unit of its precise round trip value.

3. The period of the master network clock transmission establishes a "frame". This frame is further segmented into subframes at the remote.

4. The remote establishes a receive clock reference (a delayed version of the Master Network Clock) and a transmit clock reference.

5. For analog applications, the remote sends a long train to the master and the master trains and stores equalization taps and automatic gain control settings unique to the drop. This is unnecessary for digital networks due to the continuous presence of traffic (either idle codes or data).

6. The master unit preassigns time slots within the subframes, one for each of the independent host applications.

7. Upon receiving a poll at the remote DTE, RTS/CTS toggles and the DTE response bits are loaded into a buffer. The remote then transmits these bits in the assigned time slot using the transmit clock reference. Therefore, contention due to inbound poll responses from other remotes is precluded. All inbound transmissions contain a preamble, poll response data bits, reservation request bits, at least one priority bit and error detection bits. In the case of analog networks, the preamble is unique to the remote and enables the master to rapidly set the equalization taps and automatic gain control.

8. All inbound transmissions are at burst rates exceeding the remote port rate.

9. The subframe time slot is sized for the dominant poll response message length for the application. For longer transmissions, the remote unit sets the reservation bits to identify the required number of additional time slots. The priority bit or bits define the remote's relative importance in reducing poll-response delays. The master unit clocks the received message bits to the expansion buffer 30 and checks the reservation and priority bits for error. If no errors are detected, the master responds to the remote with an "authorization to transmit" command and transmits a "transmit inhibit" command to all of the other remote units. Each of these outbound transmissions are error protected so that remote transmission contention is extremely unlikely. The authorized remote commences transmission on the next available time slot and continues until the message transmission has been completed. During this period the expansion buffer clocks data bits to the host.

10. The master unit can recognize whether a remote clock is drifting and so inform the remote with a fast or slow correction value. Such information can be extracted from the actual time of arrival compared with the expected time of arrival at the master unit and the preamble which identifies the transmitted remote.

11. Analysis diagnostic related information is bit interleaved onto the outbound transmission. Because of the relatively slow poll rate of the Analysis system, the inbound response may be assigned to time slot in every Nth subframe. Thus, the aforementioned goals are achieved.

What is claimed is:

1. A communications network comprising:
    a master unit;
    a plurality of remote units communicating with said master unit in a multidrop configuration;
    wherein each of said remote units execute at least one application program, at least one of said remote units executing at least two application programs, said remote units receiving messages outbound from said master unit and responding in a time slot assigned to each of said application programs;
    said master unit including a master network timing means with a period which is divided into a plurality of subframes, wherein each subframe is divided into said time slots, and each of said time slots is used as an interval in which one of said application programs in said one of said remote units is assigned to transmit to said master unit in a time division multiple access fashion; and
    said master unit including ranging means communicating with said master network timing means wherein a transmission time between said master unit and each of said respective remote units is calculated and transmitted from said master unit to each of said respective remote units, each of said respective remote units using said transmission time to adjust initiation of said time slots.

2. The network of claim 1 wherein said remote units include a reservation request generator which activates a reservation request bit for requesting an additional time interval inbound to said master unit, and wherein said master unit includes a reservation request processor communicating to said master network timing means, said reservation request processor being responsive to said reservation request bit.

3. The network of claim 2 wherein said master unit initiates communication with said remotes using half duplex polled protocols.

4. The network of claim 3 wherein communication from said remote units to said master unit is in the form of modulated bursts on an analog carrier frequency.

5. The network of claim 4 wherein communication from said remote units is received by a burst equalizer in series with a burst automatic gain control in said master unit, said burst equalizer and said burst automatic gain control being responsive to operating parameters which are dependent upon which of said remote units is scheduled to transmit.

6. The network of claim 5 wherein said operating parameters are calculated in an initial training period and stored in said master unit.

7. The network of claim 6 wherein said operating parameters are indexed in said master unit and advanced from said master unit to said burst equalizer and said automatic gain control in response to a preamble unique to each of said remote units which is communicated from said remote units to said master unit.

8. The network of claim 3 wherein communication from said remote units to said master units is in digital form.

9. The network of claim 8 wherein communication between said remote units and said master unit is encoded using baseband modulation.

10. The network of claim 3 wherein said master unit includes a master network clock with a period which is divided into a plurality of subframes, each corresponding to transmission time for one of said remote units, and wherein each subframe is divided into said time slots, and each of said time slots is used as an interval in which one of said applications programs in said one of said remote units transmits to said master unit.

11. The network of claim 2 wherein said time slot comprises a format so as to include a preamble, a poll response data bit, said reservation request bits, at least one priority bit and error detection bit.

12. The network of claim 1 wherein the master unit includes means for calculating clock drifts of the remote units and issuing reset commands to correct the same whereby each remote unit determines its transmit epoch accurately, thereby minimizing guard time while maintaining contention-free transmission to said master unit, said means for calculating clock drifts and issuing reset commands being in communication with said master network timing means.

13. The network of claim 4 wherein said bursts occur at a burst rate which is greater than an aggregate port rate of said remote units.

14. A method for a plurality of remote units to operate a plurality of application programs in communication with a master unit in a multidrop configuration, comprising the steps of:
    calculating and storing in said master unit inbound and outbound transmission times between the master unit and said remote units;
    dividing a period of a clock in said master unit into a number of subframes, dividing each subframe into a number of slots, each corresponding to transmission times for one of said remote units, and assigning a slot to each of said application programs in said one of said remote units;
    transmitting from said master unit to each of said respective remote units the transmission time between said master unit and said respective remote unit, each of said respective remote units using said transmission time to adjust initiation of said slots; and
    transmitting data from each of said remote units to said master unit in a time division multiple access configuration wherein each application in each remote unit transmits during said assigned subframe.

15. The method of claim 14 further comprising the step of initiating communication between said master unit and said remote units by using half-duplex polled protocols.

* * * * *